United States Patent [19]

Saitoh

[11] Patent Number: 5,251,077
[45] Date of Patent: Oct. 5, 1993

[54] METHOD OF READING DIGITAL DATA ON MAGNETIC TAPE

[75] Inventor: Shuichi Saitoh, Tachikawa, Japan

[73] Assignee: TEAC Corporation, Tokyo, Japan

[21] Appl. No.: 715,085

[22] Filed: Jun. 11, 1991

[30] Foreign Application Priority Data

Jun. 15, 1990 [JP] Japan ................... 2-157840

[51] Int. Cl.$^5$ .................. G11B 20/12; G11B 20/18
[52] U.S. Cl. .................................. 360/53; 369/54
[58] Field of Search .................. 360/53, 39; 369/54, 369/58

[56] References Cited

U.S. PATENT DOCUMENTS 4,637,023  1/1987  Lounsbury et al. ............. 360/53
4,638,472  1/1987  Ogata et al. ................... 360/53

Primary Examiner—Paul M. Dzierzynski
Assistant Examiner—Richard Hanig
Attorney, Agent, or Firm—Woodcock Washburn Kurtz Mackiewicz & Norris

[57] ABSTRACT

A reading method for a magnetic tape having a series of frames each constituted of a predetermined number of data blocks. For reading any given frame of the tape more quickly than heretofore in the face of a possible read error or errors, there is employed a buffer memory capable of temporarily storing the data from one complete frame preparatory to delivery to a host system. As the successive blocks of the frame are read by an electromagnetic transducer, the data from each block is checked for an error by a check signal read from that block, and the data from only those blocks where no read error has been found are written on the buffer memory. Then, in event a read error has been found on more than a predetermined number (e.g. one) of blocks, all the blocks of the same frame are reread. During this rereading, the data from only those blocks where a read error has been found during the initial reading are checked for an error and written on the buffer memory if no error has been found. The rereading of the same frame may be repeated up to a predetermined number of times until a read error becomes found on not more than the predetermined number of blocks.

3 Claims, 3 Drawing Sheets

METHOD OF READING DIGITAL DATA ON MAGNETIC TAPE

BACKGROUND OF THE INVENTION

My invention relates to a method of reading digital data on magnetic tape. More specifically, my invention pertains to a reading method for use with magnetic tape having a series of frames each having a predetermined number of data blocks. An electromagnetic transducer or head for reading the tape may be of either the fixed or the rotary type.

As is well known, magnetic tape represents one of the most widely accepted media for the storage of digital data. Usually, a magnetic tape has a recording track constituted of a multiplicity of frames in succession. Each frame has a predetermined number (e.g. sixteen) of data blocks, on which work data is to be stored along with control data, followed by two error checking and correction blocks. When an error occurs in reading any of the data blocks of each frame by the transducer, that data block has so far been reread by rewinding the magnetic tape to an extent necessary for the data block to travel past the transducer again when the tape is subsequently forwarded. Usually, the rereading of any data block has been retried as many as sixteen times if that data block has not been read correctly each time. I will elaborate on this subject in the course of the detailed description of my invention.

The time required for reading each data block during normal operation is of the order of milliseconds. By contrast, in event a read error occurs, each conventional retry has taken as long as one second or so. Thus an inconveniently long time has been necessary for reading each frame when a read error takes place on any one or more of its constituent data blocks. The repetition of the rereading of each data block on which a read error recurs is also objectionable because of the repeated rewinding and forwarding of the magnetic tape and, in consequence, the unavoidable diminution of the useful life of the tape transport.

SUMMARY OF THE INVENTION

I have hereby invented how to read digital data written in the standard format on a magnetic tape, more quickly than heretofore in the face of possible errors that will occur in reading each tape frame.

Briefly, my invention may be summarized as a reading method for use with an apparatus having a transducer for reading digital data on a magnetic tape having a series of frames each constituted of a predetermined number of blocks, each block having stored thereon the digital data along with a check signal for checking the data read from that block for a read error. The reading method of my invention involves the use of a temporary storage device capable of storing at one time the data from at least one complete frame of the tape.

According to the method of my invention, as the successive blocks of any given frame are read by the transducer, the data from each block is checked for an error by the check signal read from that block, and the data from only those blocks where no read error has been found are written on the temporary storage device. All the blocks of the same frame are reread in event a read error has been found during the initial reading. During the rereading, however, the data from only those blocks where a read error has been initially found are checked for an error and written on the storage device if a read error has not recurred. The rereading of the same frame may be repeated as required up to a predetermined number (e.g. sixteen) of times. Thus the average reading time for each frame according to the method of my invention is far less than that according to the prior art method that involved the rereading of each block where a read error has been found.

Usually, with this type of digital magnetic tape, each frame has an error check and correction block in addition to data blocks on which the digital data to be read are stored. The error check and correction block has stored thereon an error check and correction signal whereby, in event a read error has occurred on only one of the data blocks of the frame, that error can be corrected automatically. The rereading of any frame according to the method of my invention will therefore be necessary only in the case where a read error has occurred on two or more data blocks of that frame. Further the rereading of the frame may be repeated only until a read error becomes found on one data block, that error being then correctable by the error check and correction signal.

The above and other features and advantages of my invention and the manner of realizing them will become more apparent, and the invention itself will best be understood, from a study of the following description and appended claims, with reference had to the attached drawings illustrating a preferred mode of carrying out the method of my invention.

BRIEF DESCRIPTION OF THE DRAWINGS

FIG. 3 is a diagram explanatory of how each frame of the digital magnetic tape is read by the method of my invention.

DETAILED DESCRIPTION

Figure 1:
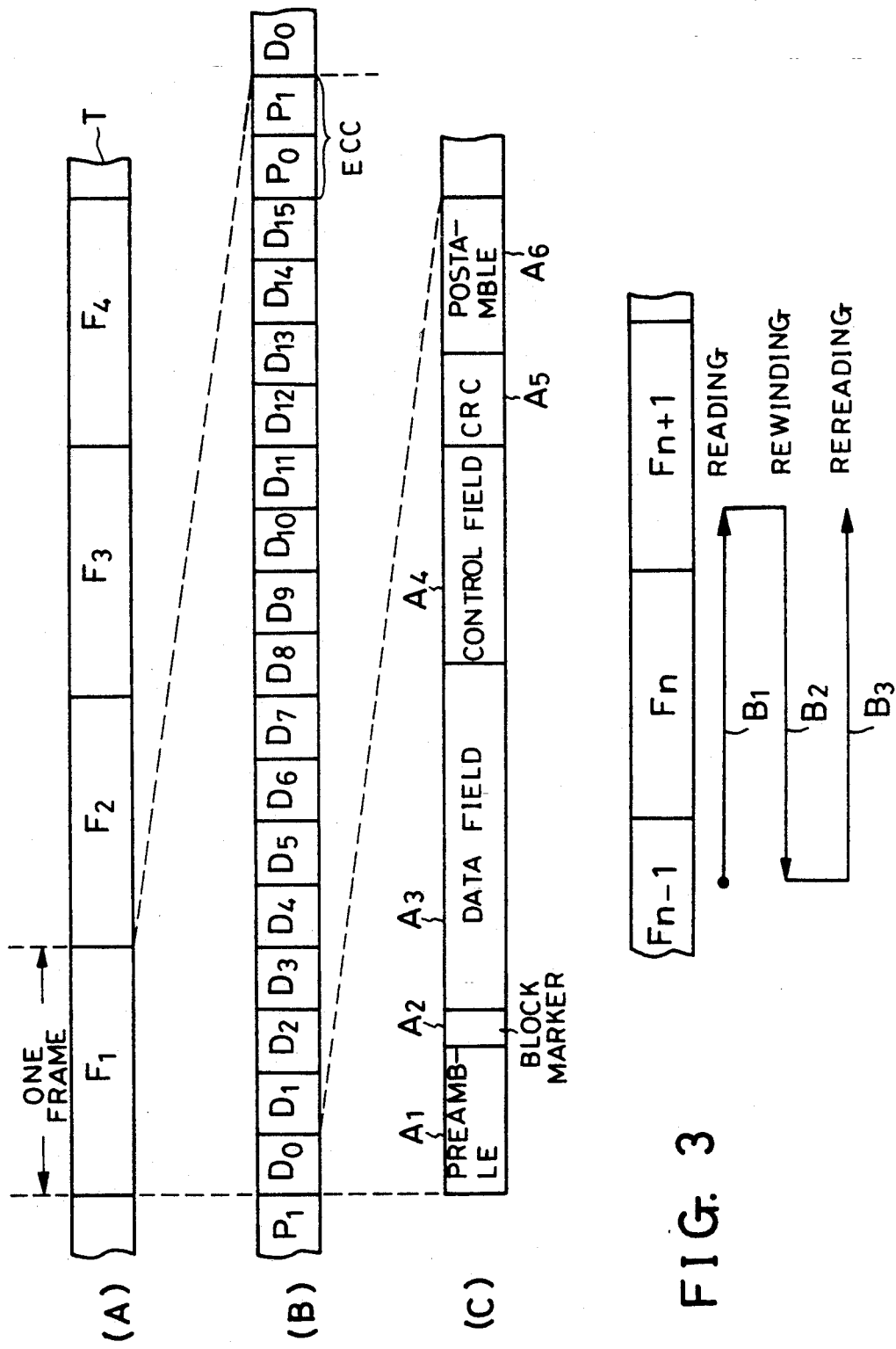
FIG. 1, consisting of (A)-(C), is a diagram explanatory of the standard recording format of the digital magnetic tape to be read by the method of my invention.

I consider it essential that the noted problem heretofore encountered in digital magnetic tape art be illustrated and explained in some more detail, in order to make clear the features and advantages of my invention. With reference therefore to FIG. 1, which shows the standard recording format with digital magnetic tape, the recording track T on the tape resolves itself into a multiplicity of frames $F_1$, $F_2$, $F_3$, $F_4$ . . . arranged sequentially as at (A). As shown at (B) in FIG. 1, each of these frames comprises a succession of sixteen data blocks $D_0$-$D_{15}$ followed by two error checking and correction (ECC) blocks $P_0$ and $P_1$.

At (C) in FIG. 1 is shown the constitution of each of the data blocks $D_0$-$D_{15}$. Each data block has a preamble zone $A_1$, a block marker zone $A_2$, a data field $A_3$, a control field $A_4$, a cyclic redundancy check (CRC) zone $A_5$, and a postamble zone $A_6$.

Both preamble zone $A_1$ and postamble zone $A_6$ contain bursts. The block marker zone $A_2$ contains a one byte mark indicative of the beginning of the data field $A_3$. This data field, which typically is 512 bytes long, is for the recording of work data from a host system to be set forth subsequently. The control field $A_4$, which typically is five bytes long, is for the recording of control data including frame addresses and signals for discriminating between the data blocks $D_0$–$D_{15}$ and the ECC blocks $P_0$ and $P_1$. The CRC zone $A_5$, typically two bytes long, is devoted to the recording of cyclic redundancy check bits for the data on the data field $A_3$ and control field $A_4$.

The sixteen data blocks $D_0$–$D_{15}$ and two ECC blocks $P_0$ and $P_1$ of each of the frames $F_1$, $F_2$, $F_3$ . . . are read sequentially. The reading of one field will be completed by a single relative scanning movement of that field by a transducer or magnetic head assembly if no error occurs in reading all the data blocks $D_0$–$D_{15}$. In event a read error takes place on any of the data blocks, the conventional practice has been to retry the reading of that data block.

Let us assume that a read error has proved to exist on the data block $D_4$ on the basis of the cyclic redundancy check on the CRC zone $A_5$ of that data block. Then the magnetic tape has been rewound and then fed forwardly to permit the head assembly to reread the data block $D_4$. The rereading of this data block has been repeated sixteen times if a read error persists. In event an error still occurs at the sixteenth retry, it has been determined after the reading of the complete frame whether correction according to the ECC blocks $P_0$ and $P_1$ is possible or not.

A similar rereading procedure has been repeated each time a read error occurs on the subsequent data blocks $D_5$–$D_{15}$ of the same field. Therefore, in event errors occur on, say, any four data blocks of any one field, then a minimum of four, and a maximum of sixty four, retries have become necessary for that field alone. I have previously pointed out the disadvantages arising from such retries. As disclosed in detail hereafter, my invention thoroughly defeats these disadvantages of the prior art.

MAGNETIC TAPE APPARATUS

Figure 2:
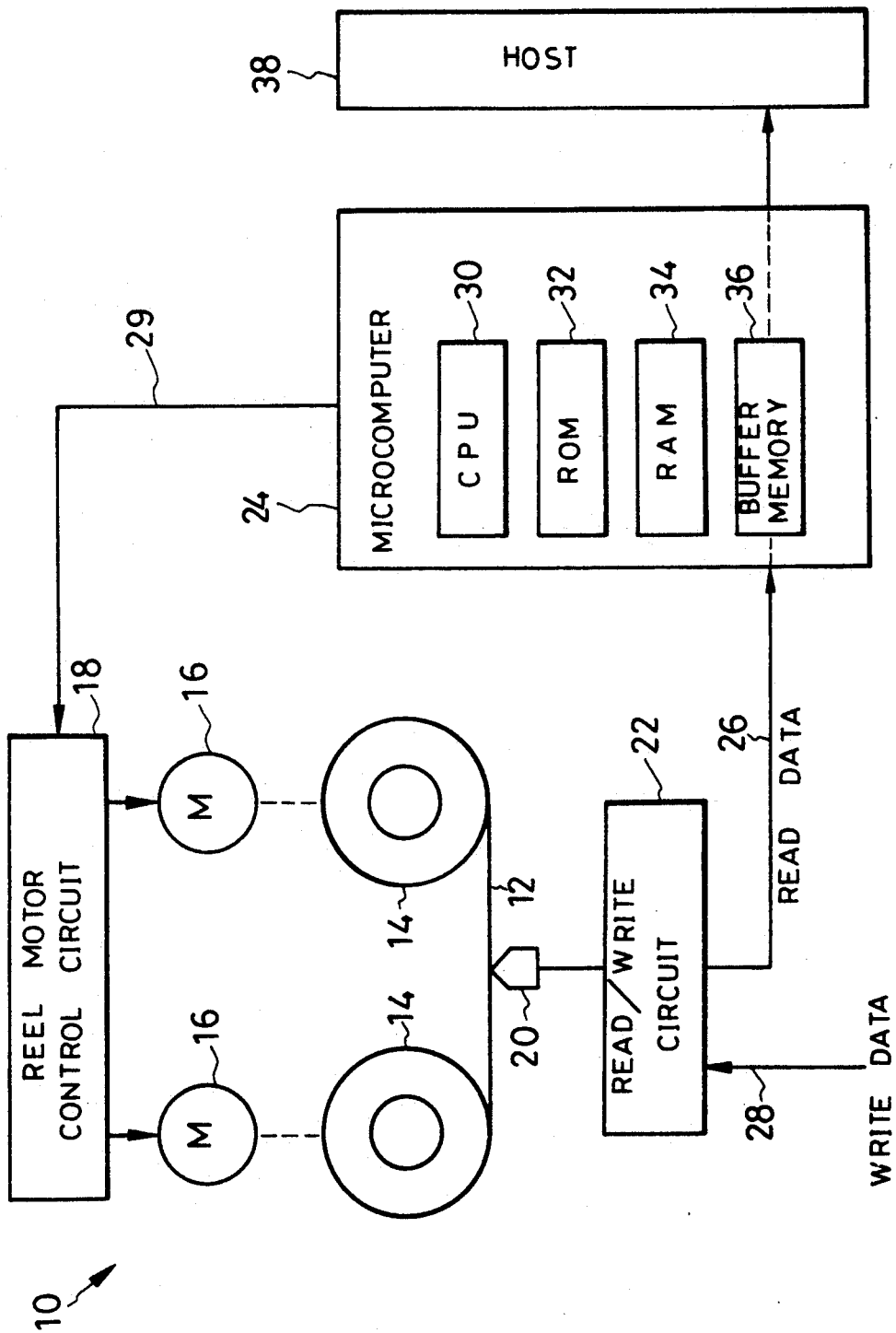
FIG. 2 is a combined schematic and block diagram of the digital magnetic tape apparatus suitable for use in carrying out the method of my invention.

With reference to FIG. 2, which diagrammatically illustrates the digital magnetic tape apparatus 10 suitable for carrying out the reading method of my invention, the magnetic tape 12 having the recording track T of the FIG. 1 format has its opposite extremities anchored to a pair of reels 14 and is to be transported therebetween. A tape transport for such reel to reel transportation of the tape 12 comprises a pair of electric reel motors 16 drivingly coupled one to each reel 14. A motor control circuit 18 is electrically connected to the pair of reel motors 16 for causing the same to bidirectionally transport the tape 12 between the pair of reels 14.

Traveling between the reels 14, the tape 12 passes an electromagnetic transducer or head assembly 20 which reads and writes data on the recording track T on the tape. As far as my invention is concerned, however, the transducer 20 is required only to read the data that have been prerecorded on the tape. A read/write circuit 22 is connected to the transducer 20 for shaping the electric output signal from the transducer prior to delivery to a microcomputer 24 over a read data line 26. Additionally, as is normally the case with this type of magnetic tape apparatus, a write data line 28 is connected to the read/write circuit 22. The write data fed over the line 28 to the read/write circuit 22 is thereby to be translated into a form suitable for writing on the tape 12 by the transducer 20. The microcomputer 24 is also connected to the reel motor control circuit 18 by way of a line 29.

The microcomputer 24 comprises a central processor unit (CPU) 30, a read only memory (ROM) 32, a random access memory (RAM) 34 and a buffer memory 36. The buffer memory 36, which constitutes an essential tool in the practice of my invention, is a temporary storage device capable of storing read data from at least one complete frame of the magnetic tape 12, preparatory to delivery to a host system 38. Among the functions of the microcomputer 24 are the detection and correction of possible errors in the read data from the read/write circuit 22 and the control of the pair of reel motors 16 for rereadings or retries. After checking the read data for possible errors and correcting them as required, the microcomputer 24 sends the read data to the host system 38.

READING METHOD

I will now proceed to the discussion of how the data on the magnetic tape 12 is read by the method of my invention. For reading any of the frames $F_1$, $F_2$, $F_3$ . . . of the recording track T on the magnetic tape 12, the reel motor control circuit 18 will first cause the reel motors 16 to transport the tape forwardly. The transducer 20 will then sequentially read all the data blocks $D_0$–$D_{15}$ and ECC blocks $P_0$ and $P_1$ of the desired frame.

Let this desired frame be $F_n$ in FIG. 3. The arrow $B_1$ in the same figure represents the above initial reading of all the data blocks $D_0$–$D_{15}$ and ECC blocks $P_0$ and $P_1$ of the desired frame $F_n$ by the transducer 20. The tape 12 may be forwarded more than one frame length, and then stopped, so that the desired frame $F_n$ may be completely scanned by the transducer 20. Frame discrimination is possible on the bases of the ECC blocks $P_0$ and $P_1$ of each frame and the frame address on the control field $A_4$ of each of the data blocks $D_0$–$D_{15}$.

During the progress of the initial reading of the successive data blocks $D_0$–$D_{15}$ of the desired frame $F_n$, the microcomputer 24 determines whether the data on the data field $A_3$ and control field $A_4$ of each data block have been read correctly or not, on the basis of the CRC signal read from the data block. The data recovered from that data block is stored on the buffer memory 36 if no read error is found. The data from any data block is not stored on the buffer memory 36 if a read error is found in that data block.

Figure 4:
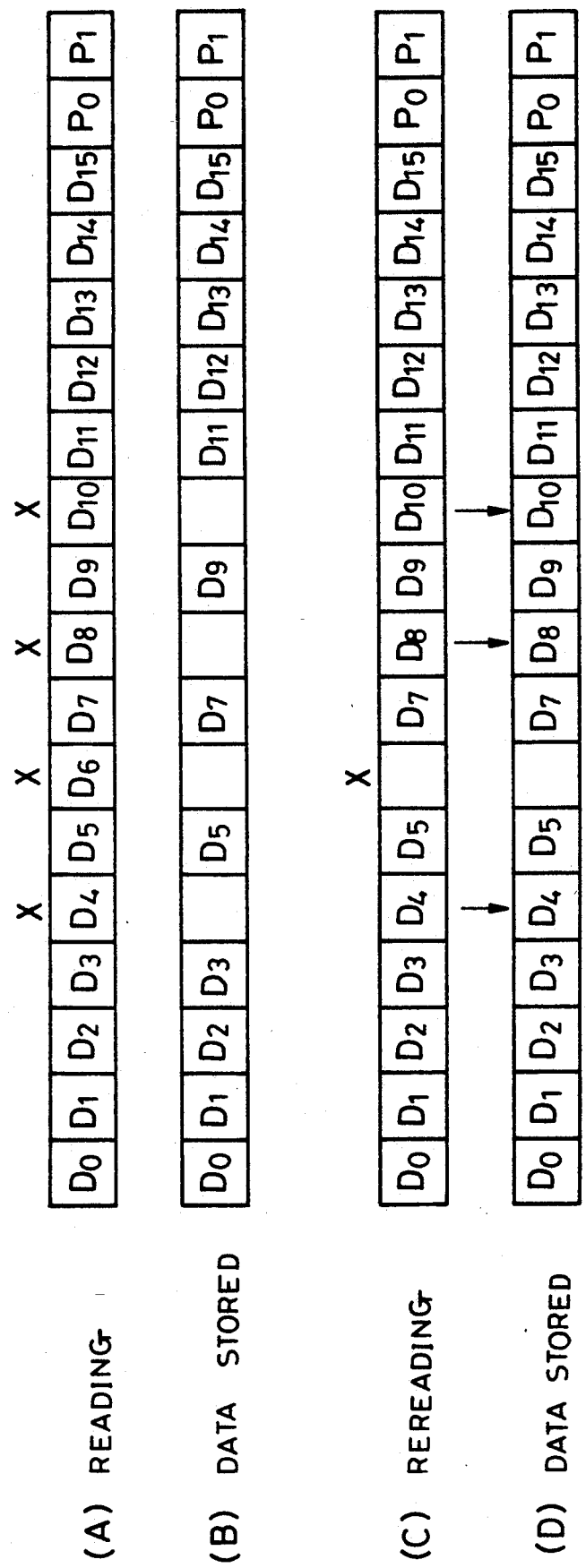
FIG. 4, consisting of (A)-(D), is a diagram explanatory of how the digital data read from the blocks of each frame are stored on the temporary storage device by the method of my invention.

Let us assume that read errors have occurred on the data blocks $D_4$, $D_6$, $D_8$ and $D_{10}$, as indicated by the indicia X at (A) in FIG. 4, during the initial reading of the desired frame $F_n$. Then the data read on all but these data blocks $D_4$, $D_6$, $D_8$ and $D_{10}$ of the frame $F_n$ will be written as aforesaid in corresponding storage locations on the buffer memory 36.

After all the data blocks $D_0$–$D_{15}$ and ECC blocks $P_0$ and $P_1$ of the frame $F_n$ have been read, the microcomputer 24 determines whether the read errors on the data blocks $D_4$, $D_6$, $D_8$ and $D_{10}$ are correctable or not by the ECC signal read from the two ECC blocks at the end of the frame $F_n$. Customarily, the two ECC blocks $P_0$ and $P_1$ are provided in each frame for the odd data blocks $D_1$, $D_3$, $D_5$, . . . $D_{15}$ and even data blocks $D_0$, $D_2$, $D_4$, . . . $D_{14}$ of that frame. The ECC bits on the first ECC block $P_0$ represent the exclusive ORs of the corresponding bits of the even data blocks, and those on the second ECC block $P_1$ represent the exclusive ORs of the corresonding bits of the odd data blocks. As is usually the case with this type of digital magnetic tape apparatus, if a read error occurs on only one data block (or on a similarly small number of data blocks) in any one frame, that read error is correctable by the ECC data on the ECC block $P_0$ or $P_1$. The reading of the desired frame $F_n$ can be terminated only by the initial reading, set forth above, if a read error that has occurred in that frame are correctable by the ECC data. Then the thus corrected data, along with the other data that have been read correctly from the other data blocks of the same frame, may be fed immediately from microcomputer 24 to host system 38.

In the present case, however, we have assumed that read errors have taken place on as many as four data blocks $D_4$, $D_6$, $D_8$ and $D_{10}$ of the frame $F_n$, as indicated in FIG. 4(A). Such errors are usually not correctable by the ECC data. FIG. 4(B) shows the read data stored on the buffer memory 36 upon completion of the initial reading of the frame $F_n$. It will be seen that the buffer memory 36 has blank storage locations corresponding to the data blocks $D_4$, $D_6$, $D_8$ and $D_{10}$. The missing read data are to be filled in these blank storage locations by the subsequent rereading of the same frame $F_n$ according to the method of my invention.

For such rereading of the frame $F_n$, the tape 12 may be rewind at least one frame length under the control of the microcomputer 24, as indicated by the arrow $B_2$ in FIG. 3. Then, as indicated by the arrow $B_3$ in the same figure, the tape 12 may be forwarded to such an extent that the complete frame $F_n$ may be scanned by the transducer 20. Thus the transducer 20 will sequentially reread all the data blocks $D_0$–$D_{15}$ of the frame $F_n$.

During this rereading of the frame $F_n$, however, the microcomputer 24 makes no error check for those of the data blocks $D_0$–$D_{15}$ on which no read error occurred during the initial reading; that is, the microcomputer disregards, so to say, the data that were read correctly during the initial reading, such read data having been already stored on the buffer memory 36 as in FIG. 4(B). For the data blocks $D_4$, $D_6$, $D_8$ and $D_{10}$ on which read errors did occur during the initial reading, the microcomputer 24 checks the read data for errors by the CRC data on the CRC zone $A_5$, FIG. 1(C), included in each such data block. The read data from any of the data blocks $D_4$, $D_6$, $D_8$ and $D_{10}$ will be stored in the corresponding storage location on the buffer memory 36 only when no error occurred on that data block during its rereading.

In FIG. 4(C) I have indicated that a read error has recurred on the data block $D_6$, but not on the other three data blocks $D_4$, $D_8$ and $D_{10}$, during this rereading of the frame $F_n$. Accordingly, as indicated in FIG. 4(D), the correct read data retrieved from the data blocks $D_4$, $D_8$ and $D_{10}$ have been written in the corresponding storage locations on the buffer memory 36 which had been left blank after the initial reading.

Thus, even after the rereading of the data blocks $D_0$–$D_{15}$ of the frame $F_n$, the data on the data block $D_6$ is still missing from the buffer memory 36 as in FIG. 4(D). However, since a read error recurred only on this one data block $D_6$ of the frame $F_n$, that error is correctable by the ECC bits on the ECC block $P_0$ at the end of that frame. The thus corrected data from the data block $D_6$ can be used as the correct read data along with the read data from the other data blocks $D_0$–$D_5$ and $D_7$–$D_{15}$ that have been stored on the buffer memory 36. All the read data from the frame $F_n$ may be transferred from microcomputer 24 to host system 38.

Possibly, a read error may recur on two or more data blocks during the rereading of the frame $F_n$. In that case the rereading of this frame may be repeated up to a predetermined number of times (e.g. sixteen) until a read error becomes found on only one data block.

Normally, it takes several tens of milliseconds for the initial reading of one complete frame, and approximately 1.1 seconds for tape rewinding and rereading of the same frame, according to the method of my invention. I have thus succeeded in drastically reducing the average time required for reading each frame of digital magnetic tape by the prior art method that involved a maximum of sixteen retries for each data block where a read error has occurred and recurred.

Although I have shown and described the tape reading method of my invention in very specific aspects thereof, I do not wish my invention to be limited by the exact details of the foregoing disclosure. Various departures from this disclosure are possible within the scope of my invention. For example, the RAM 34 of the microcomputer 24 could be employed in lieu of the buffer memory 36 as a temporary storage device for read data. Also, such temporary storage device could be provided external to the microcomputer 24.

Furthermore, as will be readily recognized by the specialists, the reading method of my invention is applicable to an apparatus employing a rotary magnetic head assembly in combination with magnetic tape having a multiplicity of slanting record tracks thereon. In this application of my invention, each slanting record track may be dealt with as one data block, and a predetermined number of such tracks may be dealt with as one frame.

Thus, in light of such possible modifications and adaptations of my invention, it is appropriate that the tape reading method of my invention be construed broadly and in a manner consistent with the fair meaning or proper scope of the following claims.

What I claim is:

1. In an apparatus having a transducer for reading digital data on a magnetic tape having a series of frames each constituted of a predetermined number of blocks in succession, each block having stored thereon the digital data along with a check signal for the determination of whether the data on that block has been read by the transducer correctly or not, a reading method which comprises:
    (a) providing a temporary storage device capable of storing at one time the data from at least one frame of the tape;
    (b) reading the successive blocks of any selected frame;
    (c) concurrently with step (b), checking the data from each block of the selected frame for a read error by the check signal read from that block;
    (d) also concurrently with step (b), writing on the temporary storage device the data from only those blocks where no read error has been found in step (c);
    (e) rereading all the blocks of the selected frame in the case where a read error has been found in step (c);
    (f) concurrently with step (e), checking the data from any block where a read error has been found in step (c), for a read error by the check signal read from that block;

(g) also concurrently with step (e), writing on the temporary storage device the data from any block where no read error has been found in step (f); and (h) repeating, as necessary, steps (e), (f) and (g) up to a predetermined number of times.

2. In an apparatus having a transducer for reading digital data on a magnetic tape having a series of frames each constituted of a predetermined number of blocks in succession, each block having stored thereon the digital data along with a check signal for the determination of whether the data on that block has been read by the transducer correctly or not, a reading method which comprises:

(a) providing a temporary storage device capable of storing at one time the data from at least one frame of the tape;

(b) reading the successive blocks of any selected frame;

(c) concurrently with step (b), checking the data from each block of the selected frame for a read error by the check signal read from that block;

(d) also concurrently with step (b), writing on the temporary storage device the data from only those blocks where no read error has been found in step (c);

(e) rereading all the blocks of the selected frame in the case where a read error has been found on more than a predetermined number of blocks in step (c);

(f) concurrently with step (e), checking the data from those blocks where a read error has been found in step (c), for a read error by the check signal read from those blocks;

(g) also concurrently with step (e), writing on the temporary storage device the data from any block where no read error has been found in step (f); and (h) repeating, as necessary, steps (e), (f) and (g) either a predetermined number of times or until a read error becomes found on not more than the predetermined number of blocks.

3. In an apparatus having a transducer for reading digital data on a magnetic tape having a series of frames each constituted of a predetermined number of data blocks and an error check and correction block in succession, each data block having stored thereon the digital data along with a check signal for the determination of whether the data on that data block has been read by the transducer correctly or not, the error check and correction block having stored thereon an error check and correction signal for checking the data read from the data blocks for errors and correcting them, a reading method which comprises:

(a) providing a temporary storage device capable of storing at one time the data from at least one frame of the tape;

(b) reading the successive blocks of any selected frame;

(c) concurrently with step (b), checking the data from each data block of the selected frame for a read error by the check signal read from that block;

(d) also concurrently with step (b), writing on the temporary storage device the data from only those data blocks where no read error has been found in step (c);

(e) correcting, in the case where a read error has been found on not more than a predetermined number of data blocks in step (c), such a read error by the error check and correction signal read from the error check and correction block of the selected frame;

(f) rereading all the blocks of the selected frame in the case where a read error has been found on more than the predetermined number of data blocks in step (c);

(g) concurrently with step (f), checking the data from any block where a read error has been found in step (c), for a read error by the check signal read from that block;

(h) also concurrently with step (f), writing on the temporary storage device the data from any block where no read error has been found in step (g); and (i) repeating, as necessary, steps (f), (g) and (h) either a predetermined number of times or until a read error becomes found on not more than the predetermined number of blocks.

* * * * *